US008839710B2

(12) United States Patent
Accursi (10) Patent No.: US 8,839,710 B2
(45) Date of Patent: Sep. 23, 2014

(54) METHOD FOR PREPARING A DRINK AND APPARATUS AND CAPSULE FOR APPLICATION OF THIS METHOD (75) Inventor: Giovanni Accursi, Porretta Terme (IT)

(73) Assignee: Caffitaly System S.p.A., Gaggio Montano (IT)

( * ) Notice: Subject to any disclaimer, the term of this patent is extended or adjusted under 35 U.S.C. 154(b) by 1136 days.

(21) Appl. No.: 12/598,020

(22) PCT Filed: Jun. 4, 2008

(86) PCT No.: PCT/IB2008/052183
§ 371 (c)(1),
(2), (4) Date: Oct. 28, 2009

(87) PCT Pub. No.: WO2008/149297
PCT Pub. Date: Dec. 11, 2008

(65) Prior Publication Data
US 2010/0129512 A1 May 27, 2010

(30) Foreign Application Priority Data
Jun. 5, 2007 (EP) ..................... 07109586

(51) Int. Cl.
*A47J 31/06* (2006.01)
*A47J 31/36* (2006.01)
*B65D 85/804* (2006.01)
(52) U.S. Cl.
CPC ......... *B65D 85/8043* (2013.01); *A47J 31/3695* (2013.01); *A47J 31/0673* (2013.01)
USPC ........................................ 99/295; 99/289 R (58) Field of Classification Search
USPC ............ 99/289 R, 295, 302 R, 307, 303, 280, 99/287, 289; 426/431, 433, 77, 112, 78, 426/79, 82, 84, 115; 222/325, 541, 83.5
See application file for complete search history.

(56) References Cited

U.S. PATENT DOCUMENTS

| 2,715,868 A | 8/1955 | Brown |
| 2,778,739 A | 1/1957 | Rodth |
| 2,899,886 A | 8/1959 | Rodth |
| 2,968,560 A | 1/1961 | Goros |

(Continued)

FOREIGN PATENT DOCUMENTS

| CH | 406561 | 1/1966 |
| CH | 605293 | 9/1978 |

(Continued)

*Primary Examiner* — Henry Yuen
*Assistant Examiner* — Phuong Nguyen
(74) *Attorney, Agent, or Firm* — Pearne & Gordon LLP (57) ABSTRACT

A method for preparing a drink by passing hot water in a capsule (1), in which first at least one cut (10) extending in a linear fashion is made through the second wall (3) of the capsule (1), substantially without removing material from it. The adjacent portions (11) of the second wall (3) delimiting the cut (10) are then allowed to draw near one another again if necessary, then, by injecting hot water into the capsule, the internal pressure in the capsule is increased to cause at least partial expulsion of the air contained in it substantially without dispensing the liquid, and, then, by deformation of the second wall (3), the adjacent portions (11) delimiting the cut (10) are moved away from one another, allowing the drink to flow out. The invention also relates to an apparatus and a capsule for implementing this method.

28 Claims, 5 Drawing Sheets

(56) References Cited

U.S. PATENT DOCUMENTS

| | | | |
|---|---|---|---|
| 3,094,917 A | 6/1963 | Rombouts | |
| 3,260,190 A | 7/1966 | Levinson | |
| 3,292,527 A | 12/1966 | Stasse | |
| 3,347,151 A | 10/1967 | Ronalds | |
| 3,403,617 A | 10/1968 | Lampe | |
| 3,470,812 A | 10/1969 | Levinson | |
| 3,589,272 A | 6/1971 | Bouladon et al. | |
| 4,077,551 A | 3/1978 | Manaresi | |
| 4,136,202 A | 1/1979 | Favre | |
| 4,846,052 A | 7/1989 | Favre et al. | |
| 4,921,712 A | 5/1990 | Malmquist | |
| 5,197,374 A | 3/1993 | Fond | |
| 5,242,702 A | 9/1993 | Fond | |
| 5,243,164 A | 9/1993 | Erickson et al. | |
| 5,347,916 A | 9/1994 | Fond et al. | |
| 5,398,596 A | 3/1995 | Fond et al. | |
| 5,472,719 A | 12/1995 | Favre | |
| 5,753,297 A | 5/1998 | Schmed | |
| 6,079,315 A * | 6/2000 | Beaulieu et al. | 99/289 R |
| 6,880,454 B2 | 4/2005 | Kollep | |
| 7,243,597 B2 | 7/2007 | Hu et al. | |
| 7,444,927 B1 * | 11/2008 | Crosville et al. | 99/295 |
| 7,640,842 B2 | 1/2010 | Bardazzi | |
| 8,425,964 B2 | 4/2013 | Doglioni Majer | |
| 2002/0023543 A1 | 2/2002 | Schmed | |
| 2003/0116029 A1* | 6/2003 | Kollep | 99/279 |
| 2004/0163543 A1 | 8/2004 | Hu et al. | |
| 2006/0107841 A1 | 5/2006 | Schifferle | |
| 2007/0181003 A1 | 8/2007 | Bardazzi | |
| 2009/0117249 A1 | 5/2009 | Ozanne et al. | |
| 2009/0175986 A1 | 7/2009 | Doglioni Majer | |

FOREIGN PATENT DOCUMENTS

| | | | |
|---|---|---|---|
| DE | 7430109 | 3/1976 | |
| DE | 3722554 | 12/1988 | |
| DE | 102004056317 A1 | 11/2006 | |
| EP | 199953 A1 | 12/1986 | |
| EP | 211511 A1 | 2/1987 | |
| EP | 242556 A1 | 10/1987 | |
| EP | 382001 | 8/1990 | |
| EP | 0468078 A1 | 1/1992 | |
| EP | 468079 A1 | 1/1992 | |
| EP | 468080 A1 | 1/1992 | |
| EP | 469162 A1 | 2/1992 | |
| EP | 471094 A1 | 2/1992 | |
| EP | 507905 A1 | 10/1992 | |
| EP | 0726053 A1 | 8/1996 | |
| EP | 1183975 B1 | 3/2002 | |
| EP | 1 243 210 Al | 9/2002 | |
| EP | 1243210 A1 | 9/2002 | |
| EP | 1247756 | 10/2002 | |
| EP | 1243210 B1 * | 11/2004 | A47J 31/40 |
| EP | 1555218 A1 | 7/2005 | |
| EP | 1557373 A1 | 7/2005 | |
| EP | 1599117 A1 | 11/2005 | |
| EP | 1674007 A1 | 6/2006 | |
| EP | 1299022 B1 | 2/2007 | |
| EP | 1859712 A1 | 11/2007 | |
| FR | 1198879 A | 12/1959 | |
| FR | 1537031 | 8/1968 | |
| FR | 2062337 | 6/1971 | |
| FR | 2171306 A1 | 9/1973 | |
| FR | 2556323 A1 | 6/1985 | |
| FR | 757358 A | 12/1993 | |
| GB | 938617 A | 10/1963 | |
| GB | 2023086 A | 12/1979 | |
| WO | 8602537 | 5/1986 | |
| WO | 9507648 A1 | 3/1995 | |
| WO | WO0115581 A1 | 3/2001 | |
| WO | WO2004026091 A1 | 4/2004 | |
| WO | 2005090196 | 9/2005 | |
| WO | WO 2006003116 A1 * | 1/2006 | A47J 31/40 |

* cited by examiner

FIG. 8

METHOD FOR PREPARING A DRINK AND APPARATUS AND CAPSULE FOR APPLICATION OF THIS METHOD

REFERENCE TO PRIORITY APPLICATION

The present application is the national stage entry into the United States of International Application Number PCT/IB2008/052183, filed Jun. 4, 2008, which claims priority to European Patent Application Number 07109586.3, filed Jun. 5, 2007, in the name of the present inventor.

BACKGROUND

The present invention relates to a method for preparing a drink by passing pressurised hot water in a sealed capsule, and to an apparatus and a capsule which allow this method to be implemented.

The present invention is intended in particular for preparing coffee, so, for the sake of simplicity, the following description refers explicitly only to that drink. However, the present invention shall still be considered as being intended for preparing any drink which can be obtained by passing hot water in a capsule containing a substance to be extracted or dissolved (normally grains or powder), according to the methods described below.

The use of disposable capsules for preparing coffee has been known for many years. They are usually sealed capsules, which may have filters, through which hot water, under pressure if necessary, is injected, to extract the coffee from the powder or grains contained in the capsule. The outflow of the drink is guaranteed by an opening made through the second wall of the capsule.

Since the quality of the drink obtained is very much dependent on the methods with which the water is passed through the capsule, with the passage of time many processes and apparatuses intended for preparing such drinks have been developed. For example, a capsule containing a mixture of powdered coffee can be used to obtain a simple infusion by slowly percolating low pressure hot water through it, or the so-called "espresso" (that is to say, a drink with significantly different organoleptic properties) if pressurised hot water is percolated through it. The quality of the espresso may be further improved by forced pre-infusion before starting to dispense the drink from the capsule, then maintaining a pre-determined pressure in the capsule during the entire dispensing period.

Usually, the times, temperatures and pressures during the pre-infusion and dispensing steps, the intergranular flow speed and therefore the micro-turbulences generated are essential for obtaining a good organoleptic result. Since not all soluble substances contained in coffee are useful for an optimum result, attempts must be made to optimise the extraction cycle so that the appearance, smell and taste confirm the positive outcome of the process. Up to now, these empirical means have been the only ones considered really reliable to define the quality of the coffee.

Thus, the main technique for making a good quality espresso is broadly speaking widely known. However, in practice achieving a good level of quality and maintaining it constant with the passage of time are not certain and not easy. This is because there are many factors which contribute to the success of the operation, difficult to quantify and sometimes not even clearly identifiable, since even minimal changes in operating circumstances may produce considerably different effects. Moreover, when selecting production methods, preference should be given to simple, reliable methods with low industrial cost, but which guarantee a good end result. It is not commercially feasible to use methods that are too complex and therefore too expensive in order to achieve an optimum result.

As already indicated, one of the techniques recognised as being able to improve the result in terms of the quality of espresso coffee is pre-infusion. This consists of introducing hot water into the capsule, preventing it from flowing out until the internal pressure has reached a predetermined value (and if necessary this has been maintained for a predetermined time). This operation should allow the water to deeply penetrate the micro-pores of the coffee granules/powder, thanks to its own pressure compressing and therefore reducing the volume of the gaseous substances present in said pores. This deep penetration on one hand would allow the water to strike a significantly larger surface than that formed exclusively by the granule outer covering, and on the other would allow extraction of the aromas and essential oils found in the granule which represent most of those possessed by the coffee. Therefore, in this way, a significantly improved coffee flavour and aroma could be extracted.

The fact that preparing drinks using capsules has been a matter of great interest for a long time is indicated by the many patents relating to the subject. For example, the following:

CH 406561, CH 605293, DE 3722554, DE 7430109U, EP 199953, EP 211511, EP 242 556, EP 382001, EP 468078, EP 468079, EP 468080, EP 469162, EP 471094, EP 507905, FR 757358, FR 1198879, FR 1537031, FR 2062337, FR 2171306, FR 2556323, GB 938617, GB 2023086, U.S. Pat. No. 2,715,868, U.S. Pat. No. 2,899,886, U.S. Pat. No. 3,094,917, U.S. Pat. No. 3,292,527, U.S. Pat. No. 3,347,151, U.S. Pat. No. 3,403,617, U.S. Pat. No. 3,470,812, U.S. Pat. No. 3,589,272, U.S. Pat. No. 4,077,551, U.S. Pat. No. 4,136,202, U.S. Pat. No. 4,921,712 e WO 86/02537.

Further examples of patents describing various methods for opening the capsules are the following: WO 2005090196, EP 1557373, EP 1243210, EP 1674007, EP 0726053, EP 1599117, WO 9507648, U.S. Pat. No. 5,243,164, EP 1555218, EP 1247756.

Said patent documents substantially describe three main methods for preparing coffee or drinks using disposable sealed capsules: a first method in which the second wall of the capsule is pierced before water is injected into it, which therefore does not use pre-infusion; a second method making use of the inward opening of an openable portion of the base of the capsule (patents EP 1557373 and EP 1243210); and a third method, which instead uses pre-infusion, and in which the second wall of the capsule is pierced as a direct consequence of the increase in internal pressure due to injecting water into it.

Relative to the second method, patent EP 1243210 and patent EP 1557373 describe two very similar solutions in which the capsule opens by means of an inward deformation of an openable part of the base wall. In the case of patent EP 1557373, the openable part is obtained by pushing in the base wall along a weakening line using an external punch after the internal pressure has reached a predetermined value. In contrast, in the case of patent EP 1243210, the capsule is already made with the openable part, although the latter is shaped in such a way as to form a valve at the start of water injection into the capsule. In particular, the openable part rests on the remaining part of the base so that it cannot open outwards. Consequently, the base is actually opened by means of an outer contact element which interacts with the openable part when, following the increase in pressure, the capsule is sufficiently swollen.

In contrast, the third above-mentioned method has two main forms.

The first form, described for example in U.S. Pat. No. 4,136,202, involves the cartridge splitting open due to the increase in pressure, preferably at its weakened zones.

In the second form, coffee dispensing begins after the base of the capsule has been pierced due to the base swelling as a result of the internal pressure generated by the entry of the water, meaning that the base is torn against a fixed element which is integral with and projects from the base of the capsule housing body (patents EP 468 078 and EP 507 905). The tear obtained in this way allows the air and liquid to flow out at a pressure which depends on the resistance to piercing of the base of the capsule and the shape of the projecting sharp element.

However, these prior art technical solutions have several disadvantages.

When the base of the capsule is pushed in, a condition producing the above-mentioned compression of the air or gas in the coffee granule micro-pores has not been achieved. The increase in pressure occurs with the simultaneous presence of liquid and air/gas in the entire capsule and not just in the micro-pores, meaning that practically only the air outside the micro-pores is compressed. As a result, the water does not penetrate the micro-pores unless there are marginal phenomena such as micro-turbulences which can dynamically remove part of the air contained in some of these micro-pores.

However, it should be noticed that during the drink dispensing step, due to the dynamic resistance to drink outflow from the hole, there is a certain new increase in the capsule internal pressure, which can allow the water to partly penetrate the coffee granule micro-pores. On the other hand, following said new increase, in the absence of the reduction in pressure which would be necessary for the liquid penetrated to flow out, the solubilised substances only partly flow out of the granule.

Thus, the prior art, although allowing results in which the quality of the drink is sometimes good, implement substantially inefficient pre-infusion treatments, and therefore are susceptible of further, significant improvements. They are also not without construction problems, including in particular the narrowness of the components tolerances necessary to guarantee tearing of the base walls of the capsules in the required times and ways, with the necessary repeatability and constancy with the passage of time.

It is necessary to work very close to the maximum limits of capsule resistance to piercing in order to obtain satisfactory results, which makes it difficult to optimise the set of various parameters and tolerances involved (maximum pressure which can be reached by the pump, deformability of the capsule material and relative thickness, nature of the compound, ambient temperature, incisiveness of the piercing element, degree of projection of the latter and size tolerances in general).

From all of this it is possible to infer that there is a risk of early piercing or even no piercing at all. Moreover, perforation may sometimes be too resolute, leaving open a hole which does not sufficiently oppose the outflow, or the hole may have difficulty opening, lengthening the dispensing time more than necessary.

As already indicated, other known methods mechanically pierce the base of the capsule (in some cases removing portions, in others plastically deforming the edges delimiting the hole) before or simultaneously with the start of water entering the capsule. For simple construction, those methods do not use pre-infusion, instead seeking an acceptable result in other ways: high operating pressure values, very fine size of the grains ground, high operating temperatures, reduced hydraulic flow rates, turbulence phenomena induced by special capsule internal shapes. All of these methods are partly suitable for the purpose but are in turn complex and not very reliable (without unacceptable increases in production costs). Other methods use electronic control devices, obtaining a very moderate pre-infusion at atmospheric pressure and then raise the pressure during the subsequent step, increasing the pump capacity.

In short, all of these prior art methods obtain results which are uncertain or not entirely satisfactory, often with considerably high costs.

In this situation the technical purpose which forms the basis of the present invention is to provide a method for preparing a drink which overcomes the above-mentioned disadvantages, as well as providing an apparatus and a capsule which allow this method to be implemented.

In particular the technical purpose of the present invention is to provide a method for preparing a drink and a relative capsule and apparatus able to allow the preparation of drinks with optimum organoleptic properties.

Another technical purpose of the present invention is to provide a method for preparing a drink and a relative capsule and apparatus which guarantee a result which can be repeated and remains constant with the passage of time.

The technical purpose specified and the aims indicated are substantially achieved by a method for preparing a drink, the relative apparatus and capsule as described in the claims herein.

DESCRIPTION OF THE FIGURES

Further features and advantages of the present invention are more apparent in the detailed description below, with reference to several preferred, non-limiting embodiments of a method for preparing a drink and the relative apparatus and capsule, illustrated in the accompanying drawings, in which.

DESCRIPTION OF THE PRESENT INVENTION

Figure 3:
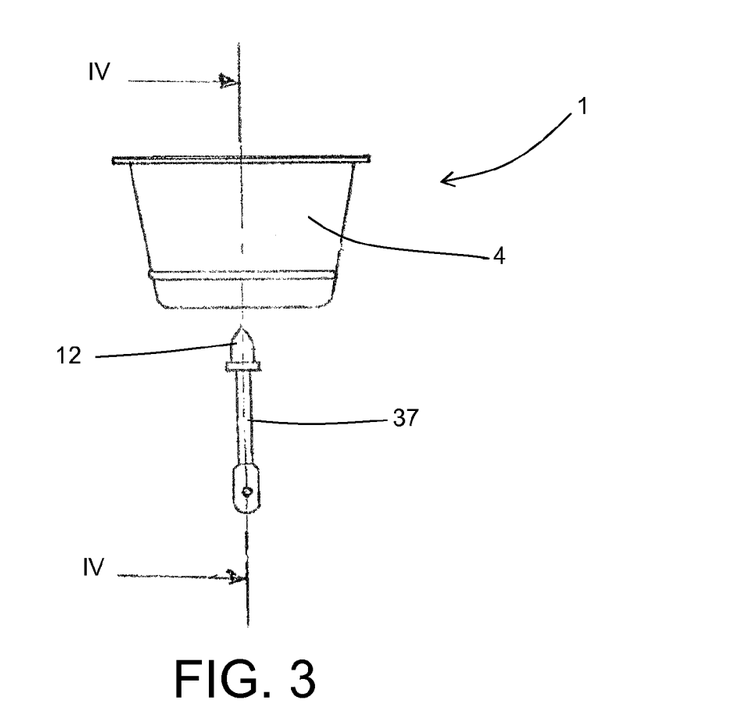
FIG. 3 is a schematic view of a capsule and capsule cutting means in accordance with the present invention.
Figure 4:
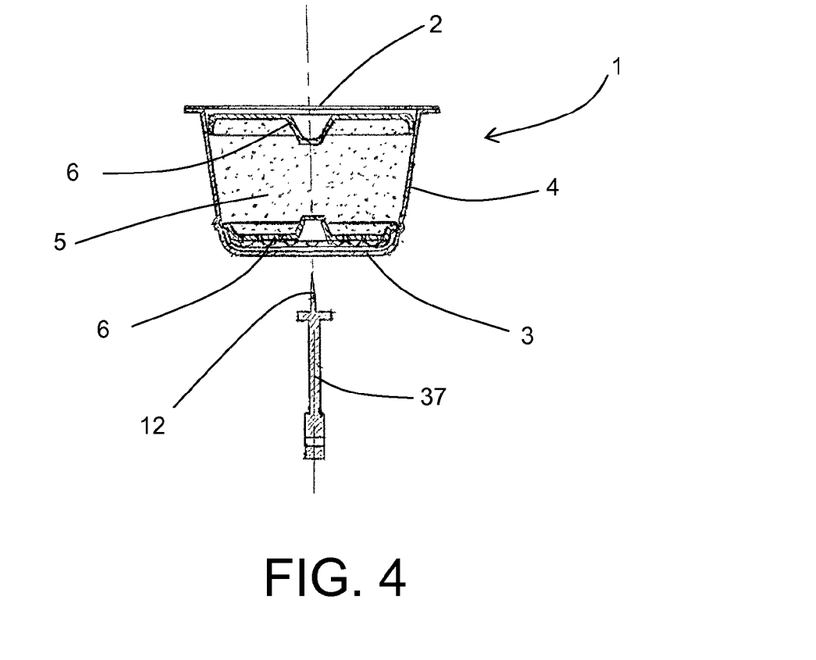
FIG. 4 shows the capsule and the cutting means of FIG. 3 according to the line IV-IV.

The method for preparing a drink in accordance with the present invention involves the use of a capsule 1 (for example of the type illustrated in FIGS. 3 and 4) having a first wall 2 and a second wall 3 connected by a lateral wall 4 and which contains a substance 5 to be extracted such as coffee powder or grains. Advantageously, the capsule 1 may also contain filters or diffusers 6 of the type illustrated in FIG. 4. Moreover, in the embodiment illustrated in the accompanying drawings, the first wall 2 is the upper wall of the capsule, whilst the second wall 3 is the lower wall of the capsule.

In the known way, the method for preparing the drink comprises the operating steps of creating a first opening through the first wall 2 of the capsule 1, creating a second opening 7 through the second wall 3 of the capsule 1, injecting hot water into the capsule 1 through the first opening and making the drink flow out through the second opening 7.

The first opening may be created in any way, for example using a spike 8 integral with a movable part of the apparatus 9, as illustrated in the accompanying drawings and described below.

Similarly, the water can be injected into the capsule 1 in any way, for example using channels directly or indirectly associated with the spike 8 which pierces the first wall 2.

In turn, according to the present invention, the step of creating the second opening 7 through with the drink must be able to flow out, comprises a plurality of steps. First, there is an operating step in which at least one cut 10 extending in a linear fashion is made through the second wall 3 of the capsule 1. Said cut 10, preferably made before the injection step, is advantageously substantially made without removing material from the capsule 1 wall, so that it is delimited by two adjacent portions 11 of the second wall 3. The cut 10 is preferably obtained using a blade 12. Moreover, it may be made both extending in a straight fashion, and extending in a curved fashion, although it is preferably made in such a way that it does not delimit lobed portions, that is to say, so that the distance between two non-adjacent points of the cut 10 is always greater than the reciprocal distance between all of the points in between the first two.

In addition, the step for creating the cut 10 is preferably carried out without affecting what is contained in the capsule 1 (in particular, the filter 6 which may separate the base of the capsule from the coffee powder). Finally, in the most common embodiments, the cut 10 is normally made so that it has a length of between 2 and 6 mm.

Depending on requirements, a plurality of cuts 10 may be made, each delimited by two adjacent portions 11 of the capsule 1 base, cuts 10 which may each be in a different zone of the second wall 3, or may intersect.

It should also be emphasised that the step of making the cut 10 may be carried out at a different moment to that of preparing the drink. The cut may already be made at the moment the capsule 1 is produced. In such a case, however, the cut 10 is preferably covered to preserve the organoleptic properties of the substance contained in the capsule. For example, each capsule may be individually packaged in a hermetically sealed wrapper, or the cut may be covered with an adhesive protective film which must be removed before using the capsule.

After the cut 10 has been made, there follows a step during which the adjacent portions 11 of the second wall 3, which delimit the cut 10, may draw near one another again, to substantially prevent, directly or indirectly, as described below, the drink from flowing out through the cut. This entails, firstly, removal if necessary, from the cut 10, of the cutting means 35 used (blade 12 or other). Only at this point are the adjacent portions 11 which delimit the cut 10 free to draw near one another again, if necessary returning to their starting position. In particular, when the operating to create the cut 10 has moved (by elastic deformation) the adjacent portions 11 from their original position (typically a movement towards the inside of the capsule 1), the actual drawing near again of the adjacent portions may take place both before the subsequent injection step (for example thanks to the elasticity of the adjacent portions 11) or after the injection step due to the increase in pressure generated inside the capsule 1. Moreover, the expulsion of the cutting means 35 from the cut 10 may be caused by the increase in pressure inside the capsule 1 due to the injection step.

In any event, according to the present invention the step of drawing near again is performed in such a way that after said step the cut 10 has a transversal size and/or a shape such that it substantially prevents the passage of liquid through it, but it does allow the passage of air. As described below, in this way the cut 10 allows air to be emptied out of the capsule 1 and, at the same time, optimum pre-infusion of the drink. If this were not possible, after the step of drawing near again the cut 10 would still preferably have a transversal size and/or a shape such that it substantially prevents the passage through it of particles of the substance 5 to be extracted (coffee) which are normally removed by the first drops of water passing through the substance. Therefore, in this case, another operating step may be identified, of blocking the cut 10 by means of said particles carried close to the cut 10 by the water injected into the capsule 1. As may easily be inferred, during this blocking step some drops of liquid exit the second opening 7 until the latter is completely blocked. However, in this case it is not possible to refer to drink dispensing.

Therefore, when the cut 10 is made in such a way that it has a transversal size such that it satisfies one of the two above-mentioned requirements, following injection of the water into the capsule 1 at least part of the air contained in it is expelled, after which several drops of liquid may be dispensed, but this is followed by a period in which drink dispensing is substantially inhibited.

In other words, at the moment when the water enters the capsule 1, the cut 10 made through the second wall 3 acts as a valve, practically open for the air or the gases contained in the capsule 1 but closed for the very first drops of liquid arriving which are dense with solid particles.

This is also the case when the transversal size of the cut 10 is too small to allow the passage of air. In that case, the edges delimiting the cut 10 are substantially coplanar and butted together but without being integral with one another. However, a minimal overpressure in the capsule 1 (for example around 0.1 bar) is sufficient for the two edges delimiting the cut 10 to move away from one another, bending slightly in such a way as to create a gap sufficient for the passage of a gas. However, in this patent, said minimal bending is not considered a deformation of the second wall 3, since that definition is reserved for deformations which allow the passage of the drink.

As already indicated, at this point of the method disclosed, the drink is still unable to exit the capsule 1, since the second opening 7 can still not be considered completely formed.

Consequently, in the subsequent step of the method disclosed, after the above-mentioned air expulsion, by continuing the step of injecting hot water into the capsule 1, the internal pressure in the capsule 1 is further increased to produce a substantial deformation (elastic or permanent) of the second wall 3, and a consequent movement away from one another of the adjacent portions 11 delimiting the cut 10, so that the drink can pass. Moreover, depending on requirements, the deformation of the second wall 3 may affect only part of the second wall (as in the case of the apparatus illustrated in the accompanying drawings), or the whole of the second wall 3.

Therefore, advantageously the injection step is in turn divided into a first sub-step during which the internal pressure in the capsule 1 increases without deforming the second wall 3 but expelling the air, and a second sub-step during which the pressure is further increased and instead deforms the second wall 3 (advantageously an elastic deformation). In practice, the passage from the first to the second sub-step corresponds with exceeding a threshold pressure to overcome the structural resistance of the second wall 3 of the capsule 1 and/or allow the expulsion of any particles blocking the cut 10.

It is immediately clear that the force necessary for the step of substantially deforming the second wall 3 must be much greater than that needed to allow the edges to move away from one another so that the air can flow out if the cut 10 has a very limited transversal size. This circumstance is accentuated by the fact that the microscopic particles accumulated at the cut 10 have a blocking action on the 10 which helps to keep it substantially hermetically sealed, preventing the passage of liquid through it. It should be noticed that, approximately and schematically, it is possible to imagine the micro-particles having a spherical shape with an average diameter of around 0.1-0.2 mm, so that, to allow them to pass through the cut 10 and consequently unblock the cut 10 and allow the liquid to flow out, the deformation required is much greater than that sufficient to allow the passage of air or liquid only. From this it may be inferred that the pressure must rise significantly before the cut 10 actually opens and allows the passage of the drink. Approximately, the overpressure must be at least 20-30 times that which allows the simple passage of air. However, it should be noticed that all of the values supplied here are given by way of example only and in no way limit the scope of the invention, since in practice they are inseparably linked to the shape and size of the cut 10 and to the thickness and type of the material used to make the second wall 3 of the capsule 1.

Figure 5:
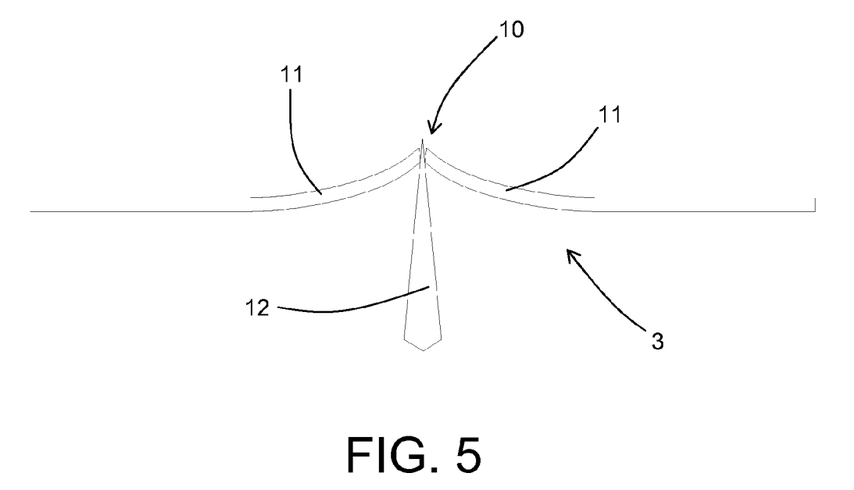
FIGS. 5 to 7 are schematic illustrations of several steps of the method in accordance with the present invention and FIG. 8 shows an alternative embodiment of movement means of the apparatus according to the present invention.
Figure 6:
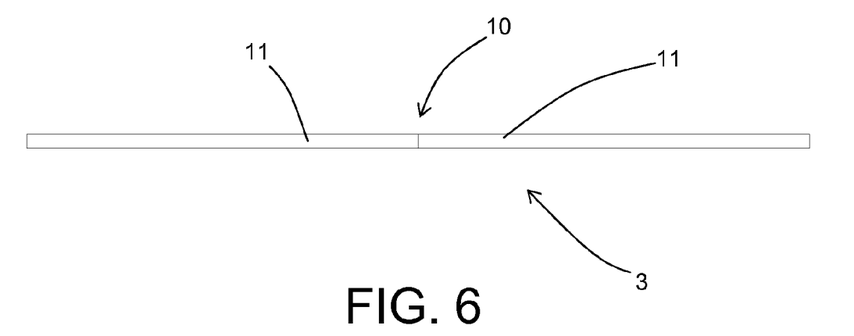
Figure 7:
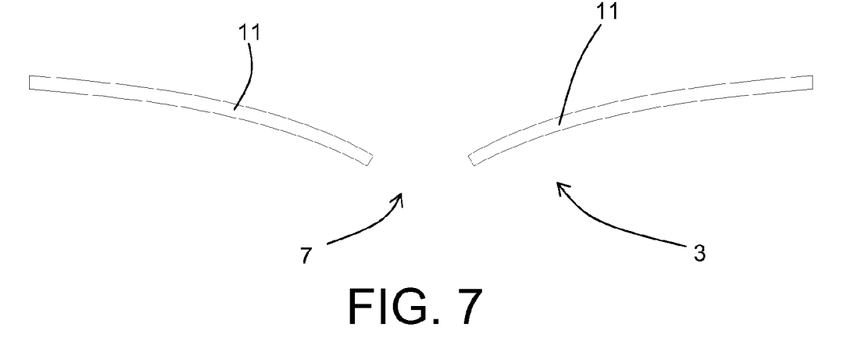

FIGS. 5 to 7 schematically illustrate the steps of making the cut 10, drawing near again of the adjacent portions delimiting the cut and subsequent deformation of the second wall 3 of a capsule 1.

It should also be noticed that, if two or more cuts are made through the second wall 3, all of the steps described above, and in particular that of drawing near again and moving away of the adjacent portions 11 which delimit them, are preferably carried out for each cut 10.

As regards production of the drink, it should be noticed that in the step of increasing the pressure and expelling the air, with the cut 10 still closed, there is a deep and extensive penetration of the liquid in the micro-cavities of the granules, which allows abundant extraction of the desired organoleptic substances, and which is made possible by the fact that the air and/or gases in the intergranular spaces are gradually expelled. Therefore, at the end of expulsion, the only air/gas remaining is that in the micro-pores of the individual granules, which is therefore easy to compress and its volume can be reduced by up to 5-10 times. However, the actual compression of said air depends on the internal pressure in the capsule 1, so that maximum compression is achieved at the moment when deformation of the second wall 3 and/or expulsion of the blocking particles allow the drink to flow out of the cut 10 (maximum pressure moment).

Immediately after the start of drink dispensing there is a rapid reduction in the internal pressure in the capsule 1, which allows the air/gas in the micro-pores to expand again, pushing out the water which previously penetrated there and which in the meantime extracted the aromas from inside the particles. The swiftness of the phenomenon also causes micro-turbulence phenomena very useful to the extraction process.

The method described above may be implemented with any apparatus 9 suitable for the purpose.

However, a preferred embodiment of an apparatus 9 for implementing the method described above is described below with reference to FIGS. 1 to 4.

In general, the apparatus 9 comprises at least one housing 13 in which a capsule 1 containing the substance 5 to be extracted can be inserted, and associated with means 14 for creating a first opening through a first wall 2 of the capsule 1 and means 15 for creating a second opening 7 through a second wall 3 of the capsule 1. Advantageously, the housing 13 is shaped to match the capsule 1 which must be inserted in it.

In the embodiment illustrated, the apparatus 9 also comprises a main body 16 and a secondary body 17 which operate in conjunction with one another to form the housing 13. Whilst the volume of the housing 13 is almost completely inside the main body 16, the secondary body 17 is movable relative to the main body 16 between an open position in which it allows access to the housing 13, and a closed position in which it hermetically seals the housing 13 and forms its upper closing wall.

Figure 1:
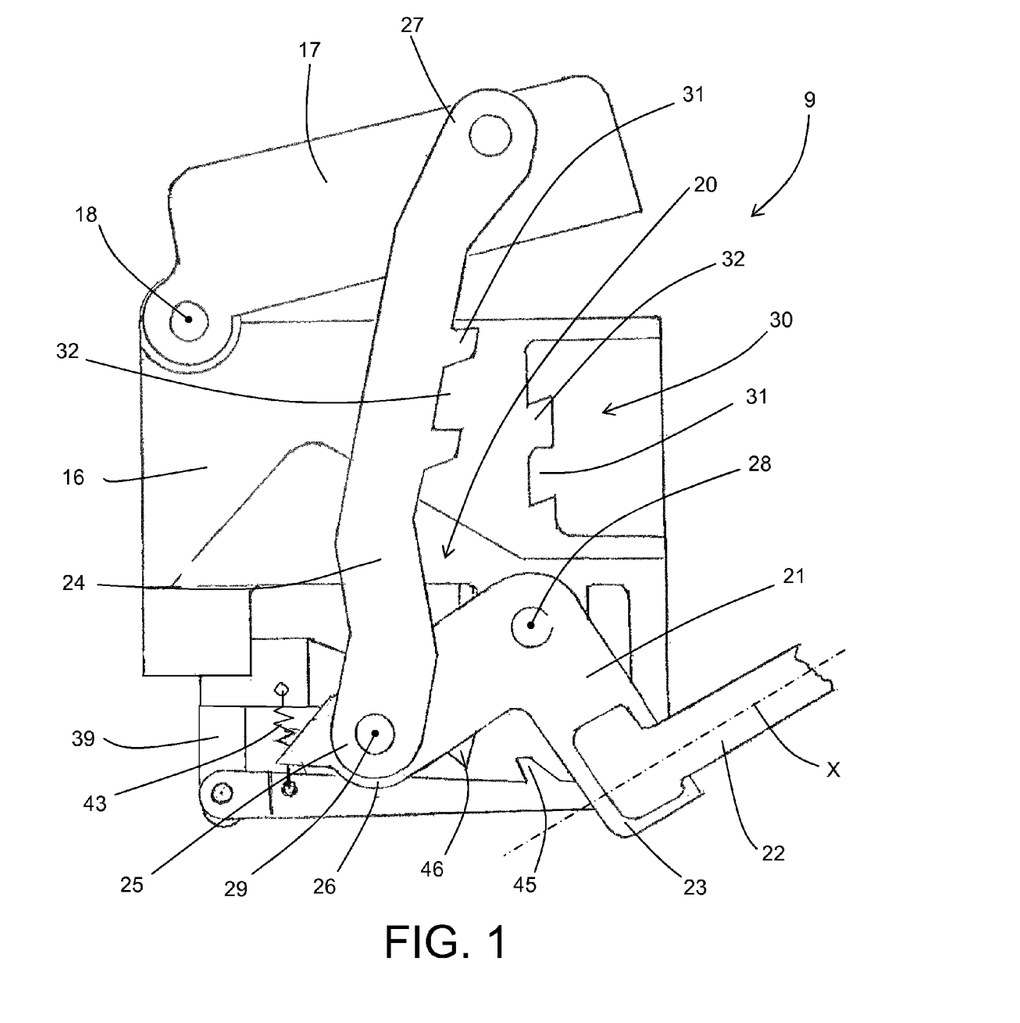
FIG. 1 is a partial schematic side view of an apparatus made in accordance with the present invention.
Figure 2:
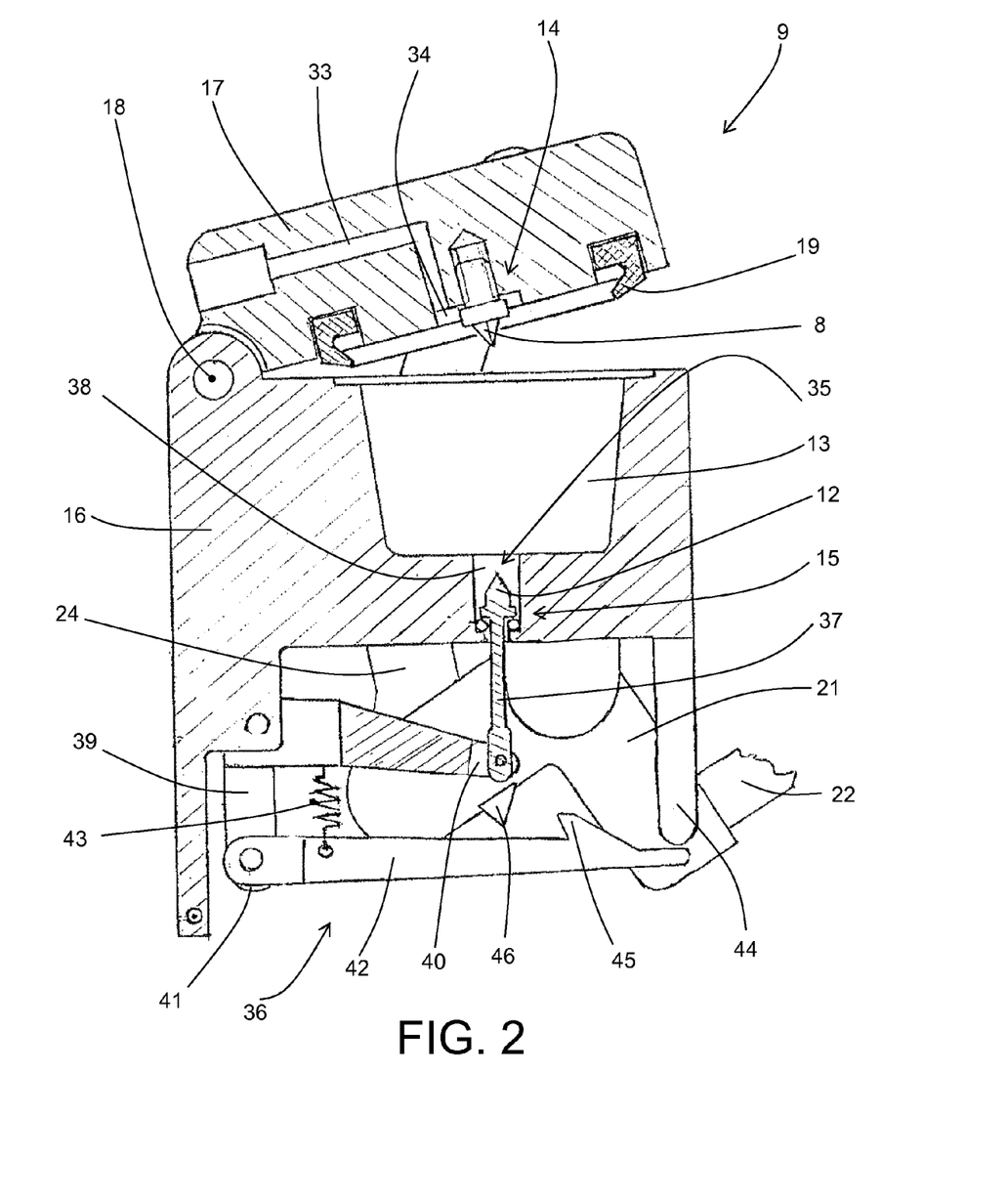
FIG. 2 is a side section of the apparatus of FIG. 1.

In particular, the housing 13 is mostly made in the upper face of the main body 16, whilst the secondary body 17 is positioned above the upper face and pivots at the main body 16 according to a horizontal axis of rotation 18. The secondary body 17 may therefore rotate between the closed position (in which it is horizontal in the accompanying drawings) and the open position (in which it is rotated upwards relative to the closed position). In FIG. 1 and FIG. 2 the secondary body 17 is shown in an intermediate position between the open and closed positions.

Sealing means 19, in the accompanying drawings shown as a ring-shaped seal, are inserted between the main body 16 and the secondary body 17, being designed to create a seal between the capsule 1 and the secondary body 17.

There is also at least one discharge pipe, not illustrated, which in the known way allows the drink to flow out of the housing 13.

The reciprocal movement of the main body 16 and the secondary body 17 is guaranteed by means 20 for moving the secondary body 17 relative to the main body 16.

In the embodiment illustrated in FIG. 1, the movement means 20 comprise:

at least one first rocker arm 21 whose intermediate portion pivots at the main body 16;

at least one actuator element 22 associated with a first end 23 of the first rocker arm 21; and at least one bar 24 whose first end 25 pivots at a second end 26 of the first rocker arm 21, and whose second end 27 pivots at the secondary body 17.

Advantageously, however, the apparatus 9 comprises two first rocker arms 21 and two bars 24 mounted specularly on the two sides of the main body 16, whilst the actuator element 22 is associated with both of the first rocker arms 21. The actuator element 22 may for example consist of a C-shaped element in which the two arms of the C are connected to the two first rocker arms 21 whilst the central part forms a handgrip for a user (not illustrated).

Rotation of the first rocker arm 21 about the point where it pivots at the main body 16 using the actuator element 22, causes by means of the bar 24, rotation of the secondary body 17 between the open position and the closed position.

In the embodiment illustrated in FIG. 1, the first rocker arm 21 has a curved shape (substantially forming a right angle) and the actuator element 22 is connected to the rocker arm according to a direction of action X substantially parallel with the line joining the point 28 where the first rocker arm 21 pivots at the main body 16 to the point 29 where the bar 24 pivots at the first rocker arm 21 (FIG. 1).

Each first rocker arm 21 can move between a maximum traction position in which the point 29 where the bar 24 pivots at the first rocker arm 21 is vertically aligned below the point 28 where the first rocker arm 21 pivots at the main body 16, and a position in which the housing 13 is open (positions not illustrated in the accompanying drawings).

When the first rocker arm 21 is in the open position, the point 29 where the bar 24 pivots at the first rocker arm 21 is rotated through a predetermined angle of rotation relative to the maximum traction position, according to a second direction of rotation which in FIG. 1 is clockwise.

In the first rocker arm 21 maximum traction position, the secondary body 17 is in its position closest to the main body 16, and therefore with maximum pressing of the sealing means 19.

However, to prevent housing 13 accidental opening, the apparatus 9 also comprises means 30 for locking the bar 24 when the secondary body 17 is in the closed position, said means comprising at least one tooth 31 and at least one cavity 32 shaped to match the tooth, one associated with the bar 24 and the other associated with the main body 16 (two in FIG. 1).

Figure 8:
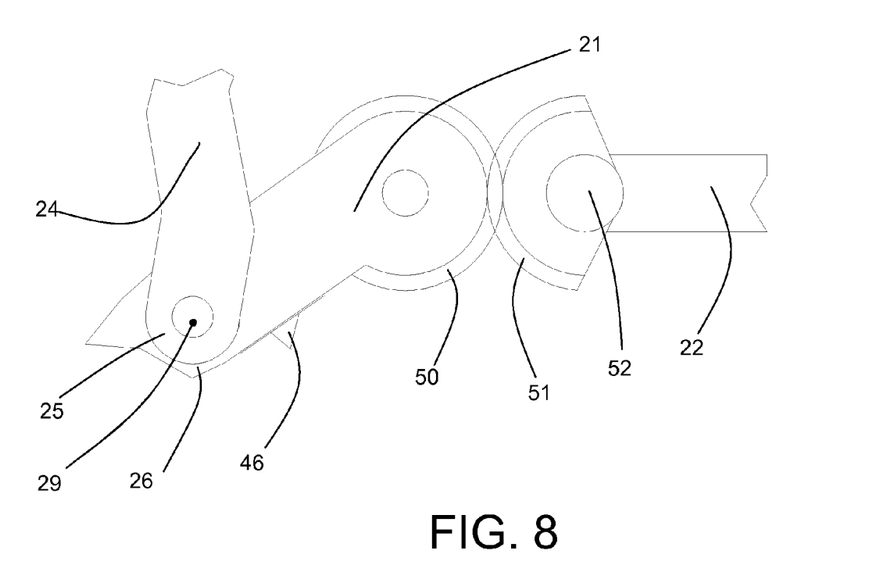

FIG. 8 shows an alternative embodiment of the movement means 20. The portion of the first rocker arm 21 forming the first end 23 is substituted by a first ring gear 50 concentric to the point 28 where the first rocker arm 21 pivots at the main body 16. The first ring gear 50 meshes with a second ring gear 51 pivoting at the main body 16 by means of a pin 52. The second ring gear 51 may be rotatably driven about the pin 52 by an actuator element 22 which may be rigidly connected either directly to the second ring gear 51 or to a through-bar (not illustrated) which joins two first ring gears 51 positioned on the two sides of the main body 16 (similarly to what is described above relative to the first rocker arms 21).

Therefore, in this case the actuator element 22 is not rigidly constrained to the first rocker arm 21 but only engages with it.

Associated with the housing 13 there are means for injecting hot water into the capsule 1, which in the embodiment illustrated comprise a channel 33 terminating in a recess 34 extending around the means 14 for creating the first opening which in turn consist of a fixed spike 8 integral with the secondary body 17 and positioned in such a way that it projects into the housing 13, piercing the capsule 1 when the housing 13 is closed.

In any case, the means for injecting water and creating the first opening may take any form (for example the channel 33 may extend into the spike 8 which may be made hollow).

The heart of the apparatus 9 disclosed consists of the fact that the means 15 for creating the second opening 7 comprise cutting means 35 designed to make at least one linear cut 10 through the second wall 3, as well as the fact that it also comprises movement means 36 for reciprocally moving the cutting means 35 and the housing 13 between a cutting position in which the cutting means 35 project into the housing 13 and can cut the second wall 3 of a capsule 1 inserted in it, and a home position in which the cutting means 35 cannot interfere with a capsule 1 inserted in the housing 13. As shown in FIG. 2, in the case illustrated the main body 16 and therefore the housing 13 remain stationary, whilst the movement means 36 only act on the cutting means 35.

In the embodiment illustrated, the cutting means 35 comprise at least one blade 12 integral with an upper end of a rod 37 which can move vertically below the housing 13 between a lower position and an upper position. The thickness of the blade 12 is preferably limited, so that the cut 10 it produces is a substantially linear cut 10 (straight or curved) in accordance with the present invention. The rod 37 is slidably mounted with a hydraulic seal through the main body 16.

The movement means 36 move the rod 37 is such a way that when it is in the upper position the blade 12 projects into the housing 13, and when it is in the lower position the blade 12 is inserted in a recess 38 made at the base of the housing 13. The recess 38 may also have the function of delimiting the zone of the second wall 3 which may be deformed. If the base of the housing 13 is shaped to match the second wall 3, only the portion of the second wall 3 at the recess 38 may be subject to the deformation step described above.

In the embodiment illustrated the movement means 36 comprise at least one second rocker arm 39 with an intermediate portion pivoting at the main body 16 and connected at a first end 40 to the cutting means 35 (to the rod 37) and at a second end 41 to an actuator element 42. In this way, the second rocker arm 39 can move between a first position in which the cutting means 35 are in the home position (FIG. 2) and a second position in which the cutting means 35 are in the cutting position (not illustrated).

Advantageously, an elastic return element (spring) 43 is connected to the second rocker arm 39 so that, in the absence of stresses from the actuator element 42, it is held in its first position. In FIG. 2, the elastic element 43 is connected between the second rocker arm 39 and the actuator element 42. Upward movement by the latter is prevented by a vertical projection 44 of the main body 16 which also has another function described below.

Moreover, in the preferred embodiment the means 36 for moving the cutting means 35 are operated directly by the movement means 20 of the secondary body 17. For this purpose, the actuator element 42 has a first engagement element 45 which can engage with the movement means 20, and in particular with a second engagement element 46 integral with the first rocker arm 21, to move the actuator element 42 when the main body 16 moves from the open position towards the closed position, so as to move the cutting means 35 towards the cutting position.

In particular, when the secondary body 17 is close to the closed position, the second engagement element 46 hooks to the first engagement element 45 so that the further rotation of the first rocker arm 21 (anti-clockwise in FIG. 2) causes a rotation—translation of the actuator element 42 (with a movement to the right in FIG. 2) and, consequently a rotation of the second rocker arm 39 (anti-clockwise in FIG. 2) which causes the cutting means 35 to be lifted towards the cutting position. Since the secondary body 17 is close to the closed position, the capsule 1 is practically locked in the housing 13 and its second wall 3 can easily be cut by the cutting means 35.

Once the cut 10 has been made, a further rotation of the first rocker arm 21 causes the first engagement element 45 to interact with the rigid projection 44 integral with the main body 16 which constitutes a disengagement element. Partly thanks to the sloping shape of the first engagement element 45, its interaction with the projection 44 causes it to rotate downwards, resulting in the first engagement element 45 being released from the second engagement element 46. At this point, the elastic return element 43 returns both the second rocker arm 39 and the actuator element 42 to the original position illustrated in FIG. 2, extracting the cutting means 35 from the housing 13. Finally, it should be noticed that the various parts are sized in such a way to disengage the actuator element 42 from the first rocker arm 21 before the secondary body 17 has reached its closed position.

Finally, as already indicated, the present invention also relates to a capsule for preparing drinks which allows the implementation of the method described above.

In the known way, the capsule contains a substance to be extracted and comprises at least a first wall 2 designed to form an inlet wall for the water to be injected into the capsule, and a second wall 3 designed to form an outlet wall for a drink obtained by interaction between the water and the substance to be extracted.

In accordance with the present invention, the second wall 3 has at least one cut 10 extending in a linear fashion, substantially made without removing material from the second wall 3. The cut is delimited by two adjacent portions 11 of the second wall drawn near one another, and has a size and/or shape such that, after the adjacent portions 11 delimiting it (of the type described above) have drawn near one another again if necessary, it allows the passage of air and substantially, directly or indirectly, prevents the passage of liquid.

In particular, the cut 10 has a size and/or shape such that, after the adjacent portions 11 delimiting it have drawn near one another again if necessary, it substantially prevents the passage of particles of the substance contained in the capsule 1 which the water carries to it, the particles and the cut 10 operating in conjunction with one another to prevent the passage of liquid.

As already indicated, the cut 10 may have a length of between 2 and 6 mm.

Moreover, the capsule may have a plurality of cuts 10, each delimited by two adjacent portions 11 drawn near one another, which may each be in a different zone of the second wall 3, or may intersect.

The capsule made as described above corresponds to the embodiment of the method disclosed in which the cut 10 through the second wall is made at the moment when the capsule is produced.

The present invention brings important advantages.

Firstly, the method disclosed allows a reliable and constant pre-infusion without the need for narrow tolerances or particularly complex and expensive mechanical, electromechanical or electronic parts.

Moreover, it is not subject to jamming by the coffee particles. In the event of jamming, the pressure in the capsule would rapidly increase again, automatically expelling the blockage. However, it should be emphasised that in practice it has been demonstrated that the blockage phenomenon is normally only manifested with the first drops of drinks dense with particles.

The apparatus has the great advantage that with a single operating movement it is possible to control all of the operations linked to making the cut and closing/opening the housing.

Moreover, the method for closing the housing through interaction between the teeth and the cavities guarantees the maximum capacity for absorption of the stresses deriving from the internal pressure.

It should also be noticed that the present invention is relatively easy to produce and even the cost linked to implementation of the invention is not very high.

The invention described may be modified and adapted in several ways without thereby departing from the scope of the inventive concept.

All details of the invention may be substituted by technically equivalent elements and, in practice, all of the materials used, as well as the shapes and dimensions of the various components, may be any according to requirements.

The invention claimed is:

1. An apparatus for preparing a drink by passing hot water in a capsule (1) containing a substance (5) to be extracted, the apparatus comprising:
    at least one housing (13) configured to receive a capsule (1) containing a substance (5) to be extracted;
    a main body (16) and a secondary body (17) which operate in conjunction with one another to form the housing (13) and which are movable between an open position and a closed position;
    means (14) for creating a first opening through a first wall (2) of the capsule (1) for injecting water in the capsule, associated with the housing (13);
    means (15) for creating a second opening (7) through a second wall (3) of the capsule (1) for drink flowing out of the capsule, associated with the housing (13); and
    means for injecting hot water into the capsule (1), through the first opening, said means being associated with the housing (13);
    the apparatus (9) being characterised in that the means (15) for creating the second opening (7) comprise cutting means (35) designed to make at least one linear cut (10) extending in a linear fashion through the second wall (3), and movement means (36) for movement of the cutting means (35), wherein the movement means (36) are effective to move the cutting means (35) (a) into a cutting position in which the cutting means (35) project into the housing (13) and can cut the second wall (3) of a capsule (1) inserted in the housing (13), and (b) into a home position wherein, when the cutting means (35) are in the home position and the main body (16) and the secondary body (17) are in the closed position, the cutting means (35) does not interfere with a capsule (1) inserted in the housing (13), and wherein, during movement of the cutting means (35) into the cutting position, the cutting means (35) move relative to the housing (13) and move relative to the main body (16).

2. The apparatus according to claim 1, characterised in that the movement means (36) are made in such a way that they move the cutting means (35) to the cutting position before the injection means start supplying hot water into the capsule.

3. The apparatus according to claim 1, characterised in that the cutting means (35) comprise at least one blade (12).

4. The apparatus according to claim 3, characterised in that the blade (12) is integral with an upper end of a rod (37) which can move vertically below the housing (13) between a lower position and an upper position, the movement means (36) moving the rod (37).

5. The apparatus according to claim 4, characterised in that when the rod (37) is in the upper position the blade (12) projects into the housing (13), whilst, when the rod (37) is in the lower position the blade (12) does not project into the housing (13).

6. The apparatus according to claim 5, characterised in that a recess (38) is made in the base of the housing (13) to receive at least part of the cutting means (35) in the home position, and in that when the rod (37) is in the lower position the blade (12) is inserted in the recess (38).

7. The apparatus according to claim 1, characterised in that the secondary body (17) is able to move relative to the main body (16) between the open position in which the secondary body (17) allows access to the housing (13), and the closed position in which the secondary body (17) closes the housing (13).

8. The apparatus according to claim 7, characterised in that the housing (13) is mostly made in an upper face of the main body (16), the secondary body (17) being positioned above said upper face.

9. The apparatus according to claim 8, characterised in that the secondary body (17) pivots at the main body (16).

10. The apparatus according to claim 9, characterised in that the secondary body (17) pivots according to a horizontal axis of rotation, the secondary body (17) in the open position being rotated upwards relative to the closed position.

11. The apparatus according to claim 7, characterised in that it also comprises means (20) for moving the secondary body (17) relative to the main body (16) between said open and closed positions.

12. The apparatus according to claim 11, characterised in that the movement means (20) comprise:

at least one first rocker arm (21) whose intermediate portion pivots at the main body (16);

at least one actuator element (22) associated with the first rocker arm (21) to rotatably drive it; and at least one bar (24) whose first end (25) pivots at a second end (26) of the first rocker arm (21), and whose second end (27) pivots at the secondary body (17);

rotation of the first rocker arm (21) causing, by means of the bar (24), rotation of the secondary body (17) between the open position and the closed position.

13. The apparatus according to claim 12, characterised in that the first rocker arm (21) has a curved shape.

14. The apparatus according to claim 13, characterised in that the actuator element (22) is connected to the first rocker arm (21) according to a direction of action substantially parallel with the line joining the point (28) where the first rocker arm (21) pivots at the main body (16) to the point (29) where the bar (24) pivots at the first rocker arm (21).

15. The apparatus according to claim 12, characterised in that the first rocker arm (21) comprises a first ring gear (50) concentric to the point (28) where the first rocker arm (21) pivots at the main body (16) and in that the actuator element (22) controls a second ring gear (51) pivoting at the main body (16) and meshing with the first ring gear (50).

16. The apparatus according to claim 12, characterised in that it also comprises means (30) for locking the bar (24) when the secondary body (17) is in the closed position.

17. The apparatus according to claim 16, characterised in that the locking means (30) comprise at least one tooth (31) and at least one cavity (32) shaped to match it, being associated one with the bar (24) and the other with the main body (16).

18. The apparatus according to claim 12, characterised in that the first rocker arm (21) can move between a maximum traction and closed position in which the point (29) where the bar (24) pivots at the first rocker arm (21) is vertically aligned below the point (28) where the first rocker arm (21) pivots at the main body (16), and a position in which the housing (13) is open in which the point (29) where the bar (24) pivots at the first rocker arm (21) is rotated through a predetermined angle of rotation relative to the maximum traction position.

19. The apparatus according to claim 12, characterised in that it comprises two first rockers arms (21) and two bars (24) specularly mounted at the two sides of the main body (16), the actuator element (22) being associated with both of the first rocker arms (21).

20. The apparatus according to claim 11, characterised in that it also comprises means (20) for moving the secondary body (17) relative to the main body (16) between said open and closed positions, and in that the means (36) for moving the cutting means (35) are operated by the movement means (20).

21. The apparatus according to claim 20, characterised in that:

the means (36) for moving comprises at least one second rocker arm (39) rotatable about its intermediate portion and connected at a first end (40) to the cutting means (35) and at a second end (41) to an actuator element (42), the second rocker arm (39) configured to move between a first position in which the cutting means (35) are in the home position and a second position in which the cutting means (35) are in the cutting position; and in that the actuator element (42) has a first engagement element (45) which can engage with the movement means (20) to move the actuator element (42) when the main body (16) moves from the open position towards the closed position, so as to move the cutting means (35) towards the cutting position.

22. The apparatus according to claim 21, characterised in that it also comprises means for disengaging the actuator element (42) from the movement means (20) positioned in such a way as to disengage the actuator element (42) after the cutting means (35) have reached the cutting position.

23. The apparatus according to claim 22, characterised in that the movement means (20) are positioned in such a way that the actuator element (42) is disengaged before the secondary body (17) has reached the closed position.

24. The apparatus according to claim 7, characterised in that it also comprises damper and sealing means inserted between the main body (16) and the secondary body (17).

25. The apparatus according to claim 1, characterised in that the movement means (36) comprise at least one second rocker arm (39) rotatable about its intermediate portion and connected at a first end (40) to the cutting means (35) and at a second end (41) to an actuator element (42), the second rocker arm (39) being able to move between a first position in which the cutting means (35) are in the home position and a second position in which the cutting means (35) are in the cutting position.

26. The apparatus according to claim 25, characterised in that it also comprises at least one elastic return element (43) connected to the second rocker arm (39) so that, in the absence of stresses from the actuator element (42), it is held in its first position.

27. The apparatus according to claim 26, characterised in that the elastic return element (43) is mounted between the second rocker arm (39) and the actuator element (42).

28. The apparatus according to claim 1, characterised in that a recess (38) is made in the base of the housing (13) to receive at least part of the cutting means (35) in the home position.

* * * * *